Jan. 10, 1933.  H. HÖME  1,893,800
SHOCK ABSORBER FOR VEHICLES
Filed Jan. 9, 1931  2 Sheets-Sheet 1

Inventor:

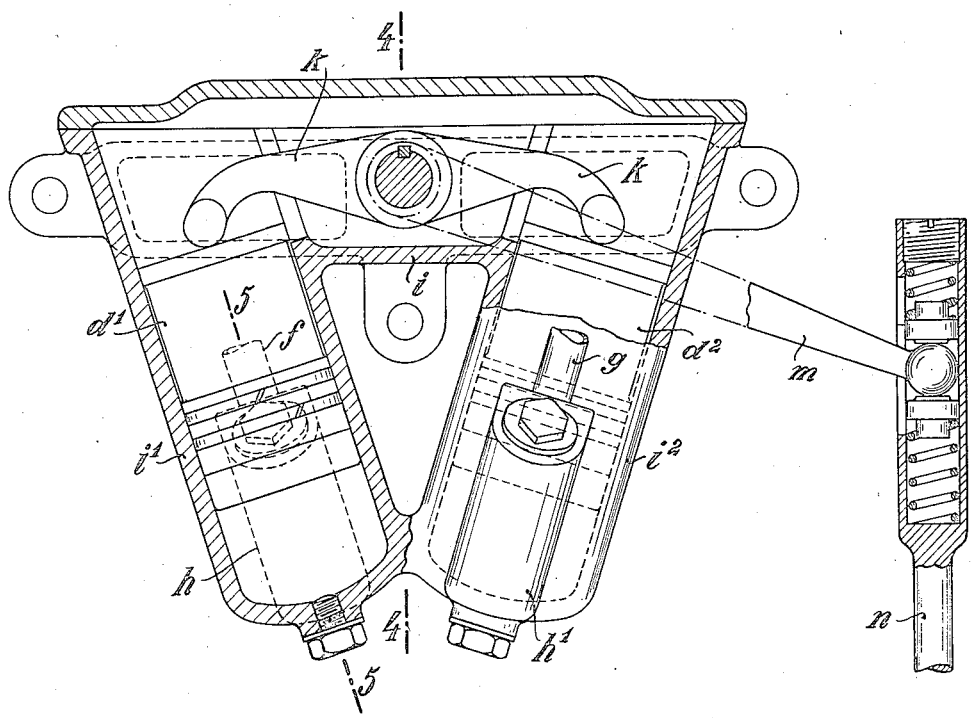
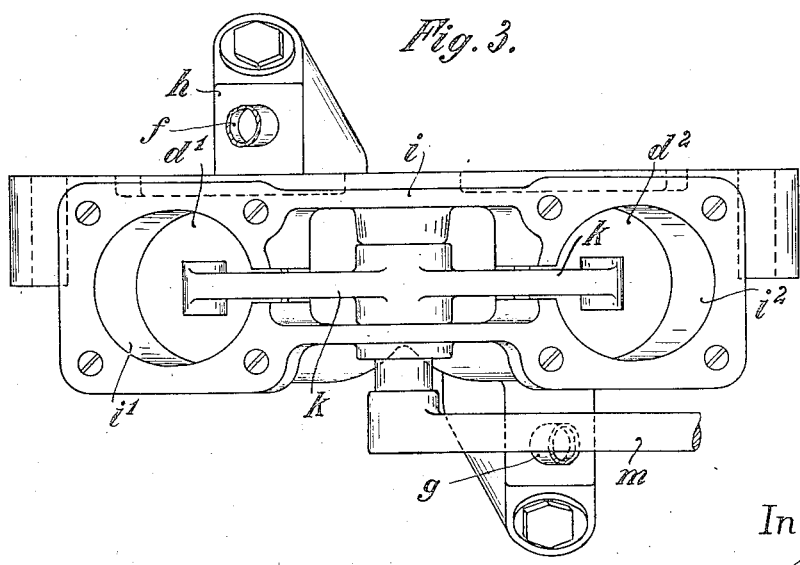

Patented Jan. 10, 1933

1,893,800

UNITED STATES PATENT OFFICE

HUGO HÖME, OF ESSEN—RUHR, GERMANY

SHOCK ABSORBER FOR VEHICLES

Application filed January 9, 1931, Serial No. 507,610, and in Germany November 17, 1930.

I have filed application for patent in Germany on November 17th, 1930, No. 63 c. H. 2519—30.

The invention relates to a shock absorber using a suitable liquid as the shock absorbing medium. The known shock absorbers of this type have the disadvantage that they are only able to absorb the shocks on that side of the vehicle on which they are fixed.

The problem which the invention solves, is to design a shock absorber which is also able to neutralize the effect of the centrifugal force acting on the vehicle body, and thus to eliminate the danger of the car skidding or turning over. According to the invention this purpose is achieved by interconnecting the two cylinders for the liquid mounted between the chassis and the axle one on each side of the body, that when one of the sides of the vehicle is depressed, the other is also depressed to the same amount.

Two constructional forms of the invention are shown in the drawings, in which

Fig. 2 shows a preferred constructional form of the invention partly in section;

Fig. 3 is a plan view corresponding to Fig. 2;

A shock absorbing cylinder $b$ is mounted rigidly on one side of the car-chassis $a$ and another one $c$ on the other side of the chassis. A piston $d$ is movably mounted in each of the cylinders $b$ and $c$, the piston of each of these cylinders being articulated to the car axle $e$. The lower end of the cylinder $b$ is connected with the upper end of the cylinder $c$ by means of a pipe $f$ and the lower end of the cylinder $c$ is similarly connected with the top of the cylinder $b$ by means of a pipe $g$. A throttling organ, for instance a valve $h$ (Fig. 5) may be provided in each of the pipes $f$ and $g$, which enables the flow of the liquid shock absorbing medium to be automatically throttled as desired.

If the car body is for instance depressed or lowered on the right side by reason of a one sided loading of the car, then the chassis tends to drop on this side, and with it also the cylinder $c$. By reason of this a certain amount of the liquid medium is forced out of the top chamber of the cylinder $c$ which flows through the pipe $f$ into the bottom chamber of the cylinder $b$ whilst simultaneously the liquid medium flows from the top chamber of the cylinder $b$ through the pipe $g$ into the lower chamber of the cylinder $c$; consequently the other side, in this case the left hand side, is depressed to the same extent. The car body is therefore, whilst at the same time absorbing the forces occurring, prevented to assume an inclined position in relation to the car axle $e$ and vice versa the car axle $e$ is prevented from assuming an oblique position in respect to the body. The centrifugal force, acting on the car body when the car negotiates a curve, is absorbed in the same way, so that any possibility of the off side wheels leaving the road is absolutely eliminated.

As is self evident, both shock absorbers act, when shocks acting in a vertical direction upon the axle of the car body occur, in exactly the same manner as the usual shock absorbers.

In the constructional form shown in Figs. 2 to 5, each of the cylinders $b$ and $c$ is replaced by a casing $i$ which comprises two cylinders $i^1$ and $i^2$ in a V-shaped disposition. In the upper part of the casing $i$ a double-armed lever $k$ is mounted so as to rock, the arms of which rest upon the piston $d^1$ and $d^2$ respectively. On the outside of the casing $i$, a lever $m$ is fixed to the axis of the lever $k$; the ball-shaped end of the said lever $m$ is elastically attached to a rod $n$, the lower end of which is linked to the axle of the vehicle.

The cylinder $i^1$ is provided with a lateral portion $h$, the hollow space $i^3$ (Fig. 5) of which encloses a tube $p$ into which a valve piston $o$ is disposed so as to move axially; the tube $p$ is provided with perforations or apertures $p^1$ and $p^2$. The valve piston is hollow and closed on one end; its side wall is likewise provided with perforations $o^1$ adapted to cover with some of the perforations $p^1$.

Figure 1:
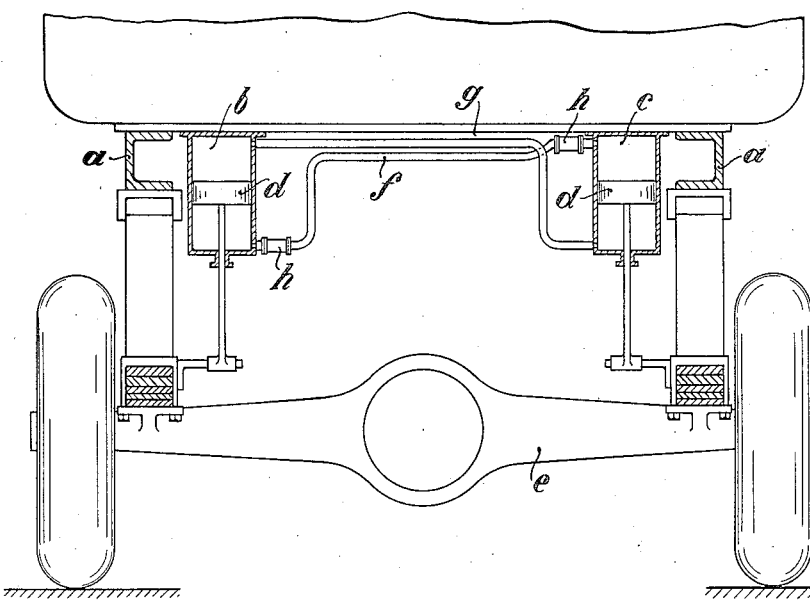
Fig. 1 shows in diagram the device adapted to the rear axle of a motor car.
Figure 4:
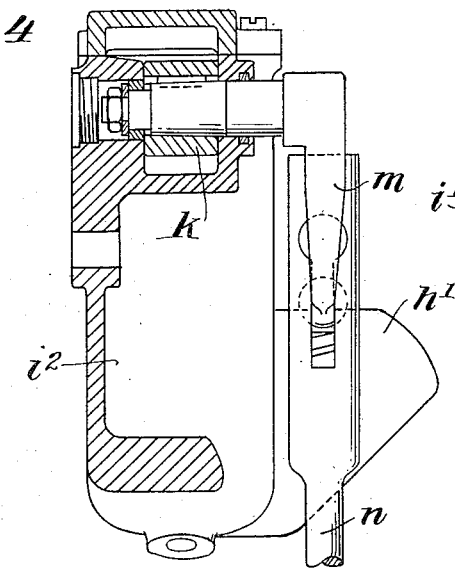
Fig. 4 is a section according to the line 4—4 of Fig. 2.
Figure 5:
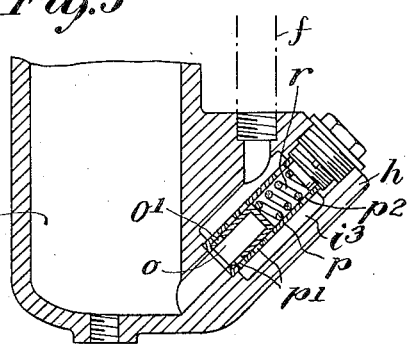
Fig. 5 is a section according to the line 5—5 of Fig. 2.

The apertures $p^1$ are adapted to be uncovered by the raising piston $o$, acted upon by a compression spring $r$, which tends to hold it in the position shown in Fig. 5. A tube $f$ is branched upon the portion $h$, connecting the cylinder $i^1$ and the space $i^3$ to the cylinder $i^2$ of the casing $i$ provided on the other side of the vehicle.

The other cylinder $i^2$ is provided with a stud $h^1$ connected by the pipe $g$ to the lateral portion $h$ of the cylinder $i^1$ provided on the other side of the vehicle, which portion $h$ again contains a piston valve $o, p$.

The shock absorber according to Figs. 2 to 5 acts in the same manner as the above described one. If the car body is lowered on one side, then the chassis tends to drop on this side and with it the casing $i$, so that the piston $d^1$ is lowered by the oscillating movement of the levers $k$ and $m$. The liquid is therefore forced out of the cylinder $i^1$; it escapes by the hollow space $i^3$ (Fig. 5) raising the valve piston $o$ against the action of its spring $r$, so that the apertures $p^1$ get free. The liquid passes through the apertures $p^1$ and the pipe $f$ to the cylinder $i^2$ provided on the other side of the vehicle. The liquid arriving in the cylinder $i^2$ raises the piston $d^2$, thus forcing down the lever $k$ likewise provided on the other side of the vehicle and causing the liquid to escape from the cylinder $i^1$ of this side and to pass through the pipe $g$ to the cylinder $i^2$ shown in Fig. 2 of the drawings. The other side of the vehicle is thus forced down by the downward movement of the levers $k$ and $m$.

The return of the liquid caused by the action of the vehicle spring shuts the valves $o, p$ so as to occupy their position shown in Fig. 5. The liquid in this position of the valves is throttled by the apertures $p^1$ and the return is operated slowly without any shock.

I claim:

1. In a liquid shock absorber for vehicles: a casing comprising two liquid cylinders on each of the sides of the vehicle; a piston for each of said cylinders; a double-armed lever mounted in said casing; a lever mounted on the axis of said double-armed lever acting to selectively operate said pistons upon movement in opposite directions; means for mounting said casings and levers between the axle of the vehicle and the chassis; and means for connecting hydraulically oppositely acting cylinders on opposite sides of the vehicle.

2. In a liquid shock absorber for vehicles: a casing comprising two liquid cylinders on each of the sides of the vehicle; a piston for each of said cylinders; a double-armed lever mounted in said casing; a lever mounted on the axis of said double-armed lever acting to selectively operate said pistons upon movement in opposite directions; means for mounting said casings and levers between the axle of the vehicle and the chassis; means for connecting hydraulically oppositely acting cylinders on opposite sides of the vehicle, and means for automatically throttling the liquid on its return, provided in each of the said hydraulic connections.

3. In a liquid shock absorber for vehicles: a casing comprising two liquid cylinders on each of the sides of the vehicle; a piston for each of said cylinders; a double-armed lever mounted in said casing; a lever mounted on the axis of said double-armed lever acting to selectively operate said pistons upon movement in opposite directions; means for mounting said casings and levers between the axle of the vehicle and the chassis; means for connecting hydraulically oppositely acting cylinders on opposite sides of the vehicle; throttling ports provided in each of said hydraulic connections; additional ports adapted to be uncovered by a valve piston; and means for holding said valve piston in a closed position.

HUGO HÖME.